United States Patent [19]

Fishman et al.

[11] 3,906,055

[45] Sept. 16, 1975

[54] EPOXY RESIN WITH METAL SALT OF BISPHENOL OR NOVOLAC AS FIRE RESISTANT COMPOSITION

[75] Inventors: Norman Fishman, Menlo Park; Dean B. Parkinson, Redwood City, both of Calif.

[73] Assignee: Stanford Research Institute, Menlo Park, Calif.

[22] Filed: Sept. 10, 1973

[21] Appl. No.: 395,842

[52] U.S. Cl..... 260/831; 260/45.75 R; 260/45.95 J; 260/47 A
[51] Int. Cl.² .................. C08G 59/62; C08K 5/13; C08L 63/02
[58] Field of Search.......... 260/47 A, 831, 45.75 R, 260/45.95 J

[56] References Cited
UNITED STATES PATENTS

| | | | |
|---|---|---|---|
| 2,819,233 | 1/1958 | Smith et al. | 260/831 |
| 2,837,493 | 6/1958 | Schlenker | 260/831 |
| 2,876,208 | 3/1959 | Naps | 260/831 |
| 3,298,999 | 1/1967 | Kiriyame et al. | 260/831 |
| 3,725,322 | 4/1973 | Weidner | 260/831 |
| 3,766,157 | 10/1973 | Parts et al. | 260/45.75 R |
| 3,776,978 | 12/1973 | Markovitz | 260/831 |

*Primary Examiner*—John C. Bleutge
*Assistant Examiner*—Arthur H. Koeckert

[57] ABSTRACT

Epoxy resin compositions having improved fire resistance are formed by the introduction into an epoxy resin composition of the type formed from epichlorohydrin and a dihydric phenol, of a small amount of a reactive hydroxy group containing polyvalent metal salt of either a dihydric phenol or a phenol-aldehyde resin of the novolac type. The resulting resins evidence increased charring of the surface when exposed to heating by a flame or undergoing combustion, the char acting as a barrier to heat transfer from the flame and retarding the flow of volatile gases from the pyrolyzing resin.

6 Claims, No Drawings

EPOXY RESIN WITH METAL SALT OF BISPHENOL OR NOVOLAC AS FIRE RESISTANT COMPOSITION

BACKGROUND OF THE INVENTION

In presently available processes for improving the fire resistant characteristics of epoxy resins, the resin is formulated using either a halogenated compound such, for example, as tetrabromobisphenol A which is capable of reacting with the other resin constituents, or a non-reactive halogenated compound which usually is added along with a compound such as antimony trioxide which is capable of interacting with the halogen compound. In either case, the resin during burning will release copious quantities of various halogenated gaseous species which prevent or retard the flame from spreading or may even cause the flame to be extinguished. Such methods are relatively expensive, however, and have the further disadvantage of posing a serious health hazard to persons having occasion to breathe any of the released vapors.

It is an object of this invention to provide a novel epoxy resin system which has improved fire resistant properties and is free of many of the disadvantages associated with the use of previously available systems. A more particular object is to provide an epoxy resin composition having a molecular structure such that increased charring of the surface of the resin will occur when the said surface is subjected to heating by a flame. The nature of still other objects of this invention will be apparent from a consideration of the descriptive portion to follow.

SUMMARY OF THE INVENTION

The present invention is based on the discovery that the foregoing and other objects of the invention can be attained by the provision of an epoxy resin composition in which a relatively small proportion of a reactive hydroxy group-containing polyvalent metal salt of either a dihydric phenol or a phenol-aldehyde resin is introduced into an epoxy resin system in which the epoxy resin component is one which has been derived from the reaction of epichlorohydrin and a dihydric phenol. The introduction of said salt into the epoxy composition greatly improves the fire resistance of the cured system when the latter is subjected to heating by a flame or is undergoing combustion. While the exact mechanism by which this improved result is obtained is not fully understood, it is considered to be attributable to increased cross-link density within the cured resin and to a molecular configuration that leads to increased charring and decreased volatilization of the resin. This generation of a protective char layer is an effective means for achieving increased resistance to fire because less fuel is formed, the char forms a barrier to heat transfer and retards the flow of volatiles.

The hydroxy group-containing salts employed in a practice of the present invention contain reactive hydroxyl groups and are the zinc, aluminum, ferric, or titanic salts of dihydric phenols or phenol-aldehyde resins. They can be prepared in known fashion by reacting a suitable salt (e.g. chloride, acetate or the like) or alcoholate of the polyvalent metal with an excess of the phenolic reactant, said excess being at least about 50 percent above the amount theoretically required to satisfy all of the metal valencies with —OH groups. This reaction, involving replacement of the hydrogen atom of a portion of the phenolic —OH groups by a metal valency, is one of metathesis which proceeds readily when the reactants are brought together in a suitable solvent and are heated under reflux conditions or on a steam bath. The by-product acid or alcohol formed during the reaction can then be distilled from the mixture along with any undesired solvent when the reaction is complete.

The phenolic compound employed to react with the polyvalent metal compounds to form the salt can be a dihydric phenol or a phenol-aldehyde resin. As employed herein, the term "dihydric phenol" is intended to designate those phenolic resins having the structure:

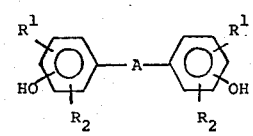

I.

where A represents oxygen, sulfur, a methylene group, a methylene group wherein one or both of the hydrogen atoms are replaced by $C_1$–$C_3$ alkyl groups (e.g., methyl, ethyl or propyl) or a chemical bond (e.g., as in biphenol), and wherein $R^1$ and $R^2$ represent hydrogen, halogen, (Cl, Br or I) or alkyl (including cycloalkyl) groups, preferably $C_1$–$C_5$ alkyl such as methyl, ethyl, propyl, iso-propyl, butyl, sec-butyl, tert-butyl, amyl and cyclopentyl. Representative dihydric phenols are 2,2-bis-(4-hydroxyphenyl) propane, commonly known as "bis-phenol A", 2,2'-methylene-bis-[4-methyl-6(1''-methycyclohexyl)-phenol], 2,2'-thio-bis-(4-methyl-6-tert.-butyl)-phenol, bis-(4-hydroxyphenyl)methane, bis-(4-hydroxyphenyl)sulfide, 4-hydroxyphenyl ether, 2,2-bis-(3,5-dicloro-4-hydroxyphenyl)propane, 2,2-bis-(3,5-dibromo-4-hydroxyphenyl)propane, and 2,2-bis-(3-methyl-5-hexyl-4-hydroxyphenyl)propane. Bis-phenol A and substituted bis-phenol A compounds can be prepared in known fashion by condensation of acetone with phenol or a substituted phenol.

The term phenol-aldehyde resin is employed herein to designate those compounds having the structure

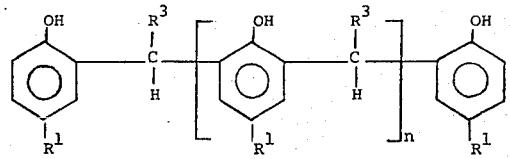

II.

wherein $n$ is a small number having an average value of from about 1 to 4, wherein the symbol $R^3$ is hydrogen or a $C_1$–$C_3$ alkyl group and wherein $R^1$ has the same meaning as given above. These phenol-aldehyde resins, which are of the so-called "novolac" type, can readily be prepared by the reaction of less than one mole of an aldehyde reactant with each mole of phenolic compound employed, the reaction being carried out in the presence of an acid catalyst to form condensation products containing reactive phenolic hydroxyl groups. Said products have the condensation carried to a stage where the material is still soluble in organic solvents, fusable, and capable of further reaction through the reactive hydroxyl groups.

The epoxy resins whose fire-resistant characteristics can be improved by the addition of the foregoing salts are those which comprise reaction products of epichlorohydrin and dihydric phenols, the latter term here having the same meaning as defined above in connection with the salts to be added to the epoxy resin. Preferred resins of this type comprise the reaction product of bisphenol A with epichlorohydron, which correspond to the structure

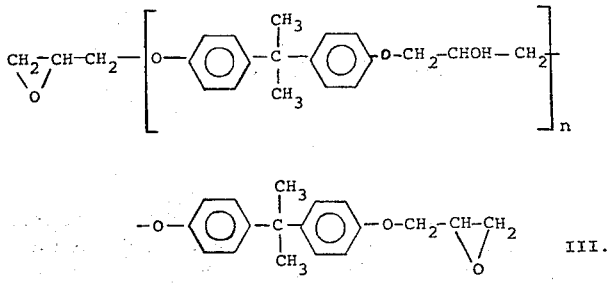

wherein $n$ represents zero or a whole or fractional small number. Other suitable epoxy resins of the type here contemplated comprise the reaction products of epichlorohydrin with other dihydric phenols such as 4,4'-dihydroxybenzophenone, bis-(4-hydroxyphenyl)-1,1-ethane, bis-(4-hydroxyphenyl)-1,1-isobutane, bis-(4-hydroxyphenyl)-2,2-propane, bis-(4-hydroxytert.-butylphenyl)-2,2-propane, bis-(2-hydroxynaphthyl)methane, 1,5-dihydroxynaphthalene, resorcinol, dihydroxynaphthalene and the like. Methods for preparing epoxy resins of this character are well known and described in the art.

The polyvalent metal salts described above are incorporated in the overall resin composition in the amount of from about 1 to 10 weight percent based on the weight of the epoxy component, i.e., that formed by the reaction of epichlorohydrin and a dihydric phenol. Amounts of the salt less than about 1% in the composition have a greatly reduced effect insofar as imparting fire retardance to the cured resin is concerned, while the use of the salt in amounts significantly larger than 10% appears to be without any benefit over and above that obtained with the lesser amount.

The compositions contemplated by the present invention may include the monomer and/or low molecular weight epoxy polymer as well as one or more of the catalysts, curing, cross-linking and hardening agents which are customarily employed in preparing resins of the type here under consideration. They may also include any desired pigment, dye, ultraviolet absorber or other adjuvant. A variety of finished epoxy compositions are provided in the examples set forth below, as are exemplary curing times and temperatures, the latter being those which are conventionally employed in working with resins of this character. The polyvalent metal salts containing active hydroxyl groups, whose use in imparting fire resistance characteristics is described above, also act as catalysts or curing agents for the composition. They are well adapted to be employed either alone or in conjunction with other catalysts in the overall resin composition.

Numerous examples are given below wherein one or another of the hydroxy group-containing, polyvalent metal salts are incorporated in epoxy formulations which are then cured and subjected to burning tests of one type or another. Similar data are provided for corresponding compositions formulated without said salt. In each case the formulations were prepared by weighing all of the ingredients, except for the critical polyvalent metal salt component, in a 250 ml beaker using the amounts indicated in the several tables given in connection with the examples. Solution was effected by heating with stirring to 150°F on a hot plate where required. The solution was cooled to room temperature, and the catalyst dissolved in DOP (dioctyl phthalate) was stirred in. The solution was then poured into a 6 in.² teflon coated pan and cured according to the schedule given in the table for the particular composition, using a convection oven. Samples of about ⅛ in. thickness were cut to the size required for test purposes.

In all of the formulations included in Examples 1 through 4 the flame resistance properties of the cured epoxy resin compositions were determined using the method described in ASTM Designation D-635 which involves igniting the end of a horizontally held specimen measuring ⅛ × ½ × 5 inches and observing the resulting burning characteristics. In those instances where the flame was extinguished, this is indicated by the letters SE. In another test these cured specimens were tested in accordance with ASTM Designation D-2863, this test monitoring relative rates of burning to provide an oxygen index. In all the examples except example 4, the indicated cured resin specimens were subjected to the National Bureau of Standards Smoke Chamber Tests to determine smoke obscuration effects and the charring that occurs under radiant heat exposure. In this test $D_s$ is the specific optical density occurring in the chamber, $D_m$ is the maximum specific optical density, $T_m$ is the time in minutes when this occurs and $T_{16}$ is the time in minutes required to reach a specific smoke density at which $D_s = 16$ (also equivalent to a 16% transmission over a viewing distance of 10 ft in a 12.5 × 20 × 8 foot room assuming that a 16% transmission is critical). The smoke chamber tests were conducted under flaming conditions with the sustaining flame impinging on the sample during the entire test.

EXAMPLE 1

An aluminum phenolate containing active —OH groups was prepared by reacting a phenol-aldehyde resin with AlCl₃ in a 3/1 mole ratio, this representing approximately a 200 percent excess of said resin. More specifically 13.3 grams of AlCl₃ were dispersed in 100 ml methylene chloride in a 500 ml, 3 neck round bottom flask equipped with a stirrer and reflux condenser. 96.3 grams of BRZ 7541, a phenol-formaldehyde novolac resin manufactured by Union Carbide Corporation, were dissolved in 100 ml of methylene chloride and the solution was slowly added to the AlCl₃ dispersion in the flask. Said BRZ 7541 material has the structure indicated at II above in which the R¹ and R³ groups are hydrogen and where n has an average value slightly in excess of 1, the molecular weight of the resin being 321. The mixture was heated to the boiling point of the solvent and refluxed for 30 minutes, after which the methylene chloride solvent and by-product HCl were distilled off. Sufficient dioctyl phthalate (DOP) was added to make a 50% solution of the salt in the DOP. This solution (identified as "aluminum-phenolate catalyst") was employed in formulating the epoxy resin compositions designated as C, D, E, G, H, I, J, and K in the following Table 1. The parts there given are on a weight basis and in the case of the aluminum-phenolate catalyst do not include the DOP component. The epoxy resin employed (Epon 828) has the general formula indicated at III above wherein n has a value slightly in excess of 0, the resin having an epoxy equivalent of 180–195.

resin hardener, as in samples J and K, self-extinguishing materials are obtained giving char formation and high oxygen index values, whereas the control sample F burns leaving no char and has a low oxygen index value. The weight loss values in the NBS smoke chamber test are much lower for the aluminum phenolate-containing samples C, G, and H than those for the corresponding control samples B and F where 100 percent weight loss occurred. The $T_{16}$ values for the aluminum phenolate-catalyzed samples are higher, and $T_m$ values about the same as compared to the control samples. With smaller samples and larger chamber volume the $D_m$ values would more dramatically illustrate the smoke reduction resulting from increased retention of Table 1

|  | A | B | C | D | E | F | G | H | I | J | K |
|---|---|---|---|---|---|---|---|---|---|---|---|
| Epoxy Resin(1) | 100 | 100 | 100 | 100 | 100 | 90 | 90 | 90 | 90 | 90 | 90 |
| Hardener(2) | — | — | — | — | — | 10 | 10 | 10 | 10 | — | — |
| Hardener(3) | — | — | — | — | — | — | — | — | — | 10 | 10 |
| Catalyst(4) | 8 | — | — | — | — | — | — | — | — | — | — |
| Catalyst(5) | — | 0.5 | — | — | — | 0.5 | — | — | — | — | — |
| Al Phenolate Catalyst | — | — | 2 | 5 | 5 | — | 1 | 2 | 5 | 2 | 5 |
| Cure Conditions(6) | (a) | (b) | (b) | (c) | (d) | (e) | (e) | (e) | (e) | (d) | (d) |
| ASTM D-635 Flame Test |  |  |  |  |  |  |  |  |  |  |  |
| Type of burn | Burns | Burns | SE | SB | SE | Burns | SE | SE | SE | SE | SE |
| Char | None | None | Firm | Crckd | Firm | None | Firm | Firm | Firm | — | — |
| Oxygen Index | <20 | 18–19 | 30–31 | 20–21 | 33–34 | 22–23 | 33–34 | 33–34 | 29–30 | 30–31 | — |
| NBS Smoke Chamber test |  |  |  |  |  |  |  |  |  |  |  |
| wt. loss, % | — | note (7) | 56 | — | — | 100 | 62 | 46 | — | — | — |
| $T_{16}$ | — | note (7) | 1.3 | — | — | 0.85 | 1.25 | 1.2 | — | — | — |
| $T_m$ | — | note (7) | 3.6 | — | — | 3.1 | 3.9 | — | — | — | — |
| $D_m$ | — | note (7) | >800 | — | — | >800 | >800 | — | — | — | — |
| Char formation | — | note (7) | Firm | — | — | None | Flaky char | Sam. crckd. | — | — | — |

Note:
(1) Epon 828 from Shell Chemical Company
(2) BRZ 7541, a phenolic-novolac resin from Union Carbide Corporation
(3) Super Beckacite 1001, a phenol-formaldehyde resin of the resole type from Reichhold Chemical Company
(4) BF$_3$-MEA, boron/trifluoride-monoethylamine complex from Allied Chemical Corporation
(5) DMP-30, 2,4,6-tris(dimethylaminomethyl)phenol from Rohm and Haas Company
(6) Cure and post cure conditions as follows:
  (a) 2 hrs at 120°C, 2 hrs at 200°C
  (b) 16 hrs at 150°C, 16 hrs at 200°C
  (c) 18 hrs at 150°C
  (d) 18 hrs at 150°C, 18 hrs at 200°C
  (e) 16 hrs at 150°C, 160 hrs at 200°C
(7) Sample melted and fell out of sample holder. This ended the flame exposure test and prevented the obtaining of meaningful smoke obscuration values.

The foregoing data of Table 1 show the effectiveness of the aluminum phenolate salt in providing flame retardance and char formation for the diglycidyl ether of Bis-phenol-A type epoxy resins. Thus, the results there tabulated show that samples C, D, and E, containing 2, 5, and 5 parts aluminum phenolate respectively, are either self-exinguishing or, as in the case of the less cured sample D, slow-burning and char-forming. The comparable control samples A and B burn readily leaving no char. The oxygen index values for the aluminum phenolate-containing samples C, D, and E are higher than those for the corresponding control samples A and B. In the case of aluminum phenolate-catalyzed formulations containing either a phenolic-novolac resin hardener, as in samples G, H, and I, or a resole phenolic char. To those skilled in the art, the importance of enhanced char formation in real fire situations is recognized as being greater than might be indicated by many of the standard test methods.

EXAMPLE 2

A zinc phenolate was prepared by reacting 3 moles of a phenolic resin (BRZ 7541) with 1 mole of ZnCl$_2$ in a manner similar to that of Example 1. Here, however, the solvent used for both reactants was tetrahydrofuran, and the ZnCl$_2$ solution was added to the BRZ 7541 solution. The resulting reaction product was again dissolved in DOP to make a 50% solution, and was employed in connection with samples B through G in the following Table 2.

Table 2

|  | A | B | C | E | D | F | G |
|---|---|---|---|---|---|---|---|
| Epoxy Resin (1) | 100 | 100 | 100 | 100 | 100 | 100 | 100 |
| Hardener (2) | — | — | — | — | — | — | — |
| Catalyst (3) | 0.5 | — | — | — | — | — | — |
| Zn Phenolate | — | 2 | 2 | 5 | 5 | 10 | 10 |
| Cure Conditions (4) | (a) | (b) | (c) | (b) | (c) | (b) | (c) |
| ASTM D-635 Flame Test | | | | | | | |
| Type burn | Burns | (SE) | (SE) | (SE) | (SE) | (SE) | (SE) |
| Char | None | Firm | Firm | Firm | Firm | Firm | Firm |
| Oxygen Index | 18–19 | — | — | 24–25 | 25–26 | 30–31 | 30–31 |
| NBS Smoke Chamber Test | | | | | | | |
| Wt. loss, % | | — | 64 | — | 17 | — | — |
| $T_{10}$ | | — | 1.0 | — | 0.0 | — | — |
| $T_m$ | (5) | — | 3.1 | — | 2.9 | — | — |
| $D_m$ | | — | >800 | — | >800 | — | — |
| Char formation | | — | Firm | — | Firm | — | — |

Note:
(1) Epon 828 from Shell Chemical Company
(2) BRZ-7541, a phenolic-novolac resin from Union Carbide Corporation
(3) DMP-30, 2, 4, 6-tris(trimethylaminomethyl)phenol from Rohm and Haas Company
(4) Cure and post-cure conditions as follows:
    (a) 16 hrs at 150°C., 16 hrs at 200°C.
    (b) 18 hrs at 150°C.
    (c) 18 hrs at 150°C., 18 hrs at 200°C.
(5) Sample melted and fell out of sample holder. This ended the flame exposure test and prevented the obtaining of meaningful smoke obscuration values.

The data tabulated above show that in the D-635 flame test, zinc phenolate-containing samples B, C, D, E, F, and G are all self-extinguishing. They exhibit fire chars and give high oxygen index values, whereas the corresponding control sample A burns, leaves no char and has a low oxygen index value.

EXAMPLE 3

An iron phenolate was prepared by reacting 10 grams of $FeCl_3 \cdot 6H_2O$ with 100 grams of a phenolic resin (BRZ-7541) in a manner similar to that of Example 1. Here, however, tetrahydrofuran was the solvent for both reactants and the desired reaction product was again dissolved in DOP to make a 50% solution. This salt additive was incorporated, in samples B, C, D, E and G, with the epoxy resin and other components at room temperature and then cured and tested as shown in Table 3.

The values tabulated above show that ferric phenolate-containing samples B, C, D, and E are either self-extinguishing or slow burning, they all forming chars and showing high oxygen index values. In contrast, the corresponding control sample A burns completely leaving no char and gives a low oxygen index value. In the case of samples F and G containing a phenolic hardener, the sample G (containing two parts of the FE(III) phenolate) is self-extinguishing, forms a firm char and has a high oxygen index, whereas the corresponding control sample F burns leaving no adherent char and has a low oxygen index value. The same type of results are shown in the NBS smoke chamber test.

EXAMPLE 4

An aluminum brominated phenolate was prepared by reacting tetrabromobisphenol-A with aluminum butylate in the ratio of 3 moles of the phenol compound to Table 3

|  | A | B | C | D | E | F | G |
|---|---|---|---|---|---|---|---|
| Epoxy resin (1) | 100 | 100 | 100 | 100 | 100 | 90 | 90 |
| Hardener (2) | — | — | — | — | — | 10 | 10 |
| Catalyst (3) | 0.5 | — | — | — | — | 0.5 | — |
| Fe(III)phenolate | — | 1 | 2 | 5 | 10 | — | 2 |
| Cure conditions (4) | (a) | (a) | (a) | (a) | (a) | (b) | (a) |
| ASTM D-635 Flame Test | | | | | | | |
| Type burn | Burns | SE | SE | SE | Slow burning | Burns | SE |
| Char | None | Firm | Firm | Firm | Porous | Char falls away | Firm |
| Oxygen Index | 18–19 | 29–30 | 30–31 | 27–28 | 23–24 | 22–23 | 33–34 |
| NBS Smoke Chamber Test | | | | | | | |
| Wt. loss, % | | — | — | — | — | 100 | 52 |
| $T_{10}$ | | — | — | — | — | 0.85 | 0.85 |
| $T_m$ | (5) | — | — | — | — | 3.1 | 2.95 |
| $D_m$ | | — | — | — | — | >800 | 725 |
| Char formation | | — | — | — | — | None | Firm |

Note:
(1) Epon 828 from Shell Chemical Company
(2) BRZ-7541, a phenolic-novolac resin from Union Carbide Corporation
(3) DMP-30, 2, 4, 6-tris(trimethylaminomethyl)phenol from Rohm and Haas Company
(4) Cure and post cure conditions as follows:
    (a) 16 hrs at 150°C., 16 hrs at 200°C.
    (b) 16 hrs at 150°C., 160 hrs at 200°C.
(5) Sample melted and fell out of sample holder. This ended the flame exposure test and prevented the obtaining of meaningful smoke obscuration values.

1 mole of butylate. More particularly, 24.6 of aluminum butylate were dissolved in 50 ml xylene and added slowly, with stirring, into a reaction flask containing 163.1 gram of tetrabromobisphenol-A dissolved in 150 ml xylene. This mixture was refluxed for 1 hour at 130°C., after which 165 grams of DOP were added. The mixture was slowly heated to 230°C., stripping off xylene xylene and the butanol reaction by-product, under vacuum. The product phenolate, 50 percent in DOP, was an amber viscous liquid. This material was that employed in formulating the B and C compositions set forth in Table 4 below. For comparative purposes, other formulations D, E, F, and G were prepared using an aluminum cresolate prepared from aluminum butylate and meta-cresol in the proportion of 1 mole of the butylate to 3 moles of the cresol. The use of this salt is taught in U.S. Pat. No. 2,837,493, to Schlenker, issued June 3, 1958. The data of the table show that this cresol compound, which contained substantially no free, reactive hydroxy groups, was ineffective from the standpoint of imparting fire resistant characteristics to the cured resin product.

cured Epon 828 formulations of the foregoing examples when employed in amounts ranging from about 1 to 10 parts per 100 parts of the epoxy resin component.

Reference is made above to Example 4 to U.S. Pat. No. 2,837,493. Attention is also directed to British Pat. No. 1,312,953, issued Apr. 11, 1973, which teaches the use, in cycloaliphatic polyepoxides, of catalysts having the composition of the salts used in the present invention. It may be noted that these salts do not impart good fire resistant characteristic to cycloaliphatic polyepoxide resins. Rather, the desired result is obtained primarily with resins of the type formed from epichlorohydrin and a dihydric phenol.

We claim:

1. An epoxy resin composition which may be cured to a resin having good fire resistance, said composition comprising an epoxy resin component formed by the reaction of epichlorohydrin with a dihydric phenol, together with from about 1 to 10 percent, based on the weight of said epoxy resin component, of a salt of a polyvalent metal selected from the group consisting of zinc, aluminum, ferric iron and titanic titanium with a Table 4

|  | A | B | C | D | E | F | G |
| --- | --- | --- | --- | --- | --- | --- | --- |
| Epoxy resin (1) | 90 | 90 | 90 | 90 | 90 | 90 | 90 |
| Hardener (2) | 10 | 10 | 10 | 10 | 10 | 10 | 10 |
| Catalyst (3) | 0.5 | — | — | — | — | — | — |
| Aluminum brominated phenol | — | 2 | 5 | — | — | — | — |
| Aluminum cresolate | — | — | — | 1 | 2.5 | 1 | 2.5 |
| Cure conditions (4) | (a) | (a) | (a) | (b) | (b) | (c) | (c) |
| ASTM D-635 Flame Test |  |  |  |  |  |  |  |
| Type burn | Burns | SE | SE | Burns (moderate) | Burns (moderate) | Burns (moderate) | Burns (moderate) |
| Char | Char falls away | Firm | Firm | Porous | Porous | Porous | Porous |
| Oxygen Index | 22–23 | 29 | 36–37 | — | — | — | — |

Note:
(1) Epon 828 from Shell Chemical Company
(2) BRZ-7541, a phenolic novolac resin from Union Carbide Corporation
(3) DMP-30, 2, 4, 6-tris(trimethylaminomethyl)phenol from Rohm and Haas Company
(4) Cure and post cure conditions are as follows:
 (a) 16 hrs at 150°C., 16 hrs at 200°C.
 (b) 16 hrs at 150°C.
 (c) 16 hrs at 150°C., 8 hrs at 200°C.

The results tabulated above show that whereas epoxide compositions cured with the tetrabromobisphenol-A aluminum compound are effectively fire resistant, the system cured with simple aluminum phenolates such as aluminum cresolate is not. Thus, the formulations containing the aluminum tetrabromobisphenol-A compound, samples B and C, form firm chars and have high oxygen index values, whereas the control sample A and the aluminum cresolate containing formulations burn leaving porous chars or no adherent char. The oxygen index of control sample A is low.

EXAMPLE 5

A titanium phenolate containing active —OH groups is prepared by reacting a phenol-aldehyde resin (BRZ 7541) with tetrabutyl titanate in the ration of approximately 5 moles of the resin per mole of the titanate. The desired product is formed by heating the reactants together for one-half hour at 175°C., the butanol product being distilled off as formed. The resulting reactant product is found to impart good fire resistance to the phenolic compound selected from the group consisting of dihydric phenols and phenol-aldehyde resins, said phenolic compound being present in an amount which is at least about 50 percent above the amount theoretically required to satisfy all of the valencies of the said metal with hydroxy groups of the phenolic compound, whereby the said salt contains reactive phenolic hydroxy groups as well as salt linkages wherein the hydrogen of a phenolic hydroxy group is replaced by a valency of the said metal; the term "dihydric phenol" as employed herein referring to compounds having the structure:

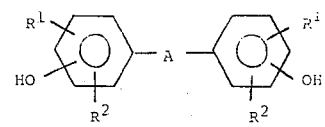

wherein A represents oxygen, sulfur, a methylene group, a methylene group wherein one or both of the hydrogen atoms are replaced by $C_1$–$C_3$ alkyl groups, or a chemical bond, and wherein $R^1$ and $R^2$ represent hydrogen, chlorine, bromine, iodine or alkyl groups; and the term phenol-aldehyde resin as employed herein referring to compounds having the structure:

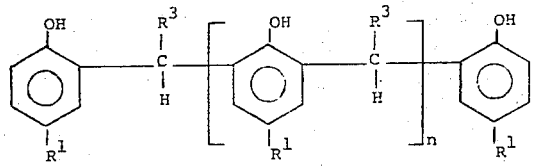

wherein $R^1$ has the same meaning as given above, $R^3$ is hydrogen or a $C_1$–$C_3$ alkyl group and $n$ is a small number having an average value of from about 1 to 4.

2. The composition of claim 1 wherein the epoxy resin comprises the reaction product of epichlorohydrin with 2,2-bis-(4-hydroxyphenyl)propane.

3. The composition of claim 2 wherein the salt is a zinc, aluminum, ferric or titanic salt of a phenolaldehyde resin of the novolac type, said resin having the structure

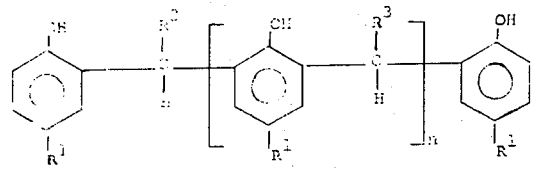

where $n$ is a small number having an average value of from about 1 to 4, $R^1$ represents hydrogen, halogen or alkyl, $R^3$ represents hydrogen or a $C_1$–$C_3$ alkyl group.

4. The method of improving the fire resistance of a cured epoxy resin composition which incorporates as the epoxy resin component a reaction product of epichlorohydrin and a dihydric phenol, said method comprising introducing into the epoxy resin system to be cured a quantity of from about 1 to 10 percent, based on the weight of said epoxy resin component, of a salt of a polyvalent metal selected from the group consisting of zinc, aluminum, ferric iron and titanic titanium with a phenolic compound selected from the group consisting of dihydric phenols and phenol-aldehyde resins, said phenolic compound being present in an amount which is at least about 50 percent above the amount theoretically required to satisfy all of the valencies of the said metal with hydroxy groups of the phenolic compound, whereby the said salt contains reactive phenolic hydroxy groups as well as salt linkages wherein the hydrogen of a phenolic hydroxy group is replaced by a valency of the said metal; the term dihydric phenol as employed herein referring to compounds having the structure:

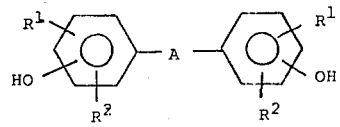

wherein A represents oxygen, sulfur, a methylene group, a methylene group wherein one or both of the hydrogen atoms are replaced by $C_1$–$C_3$ alkyl groups, or a chemical bond, and wherein $R^1$ and $R^2$ represent hydrogen, chlorine, bromine, iodine or alkyl groups; and the term phenol-aldehyde resin as employed herein referring to compounds having the structure:

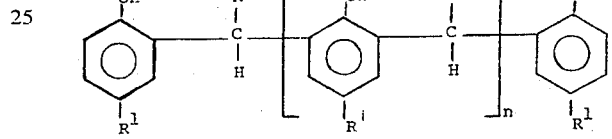

wherein $R^1$ has the same meaning as given above, $R^3$ is hydrogen or a $C_1$–$C_3$ alkyl group and $n$ is a small number having an average value of from about 1 to 4.

5. The method of claim 4 wherein the epoxy resin comprises the reaction product of epichlorohydrin with 2,2-bis-(4-hydroxyphenyl)propane.

6. The method of claim 5 wherein the salt is a zinc, aluminum, ferric or titanic salt of a phenol-aldehyde resin of the novolac type, said resin having the structure

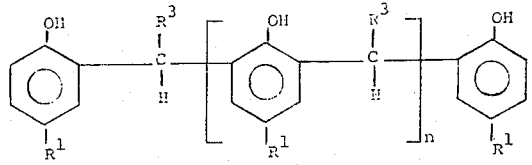

where $n$ is a small number having an average value of from about 1 to 4, $R^1$ represents hydrogen, halogen or alkyl, $R^3$ represents hydrogen or a $C_1$–$C_3$ alkyl group.

* * * * *